(12) United States Patent
Ishimura

(10) Patent No.: US 10,368,237 B2
(45) Date of Patent: Jul. 30, 2019

(54) TERMINAL, PROCESSING APPARATUS, PROCESSING SYSTEM, AND NON-TRANSITORY COMPUTER READABLE MEDIUM

(71) Applicant: FUJI XEROX CO., LTD., Tokyo (JP)

(72) Inventor: Takanari Ishimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 177 days.

(21) Appl. No.: 14/832,141

(22) Filed: Aug. 21, 2015

(65) Prior Publication Data

US 2016/0286530 A1 Sep. 29, 2016

(30) Foreign Application Priority Data

Mar. 24, 2015 (JP) ................................. 2015-061407

(51) Int. Cl.
*H04W 12/04* (2009.01)
*H04L 29/08* (2006.01)
(Continued)

(52) U.S. Cl.
CPC ............. *H04W 12/04* (2013.01); *H04L 67/02* (2013.01); *H04L 67/141* (2013.01); *H04L 69/40* (2013.01);
(Continued)

(58) Field of Classification Search
CPC ............. H04L 63/0428; H04L 63/0457; H04L 9/0822; G06F 21/10; G06F 15/16
(Continued)

(56) References Cited

U.S. PATENT DOCUMENTS 9,374,707 B2 * 6/2016 Kruglick ................ H04L 9/3236
2002/0102999 A1 * 8/2002 Maggenti ............ H04L 12/1822
455/518
(Continued)

FOREIGN PATENT DOCUMENTS

CN 102202140 A 9/2011
CN 103686586 A 3/2014
(Continued)

OTHER PUBLICATIONS

Communication dated Nov. 13, 2018 by the Japanese Patent Office in counterpart application No. 2015-061407.
(Continued)

*Primary Examiner* — Tesfay Yohannes
(74) *Attorney, Agent, or Firm* — Sughrue Mion, PLLC

(57) ABSTRACT

A terminal includes a connection unit, an acquisition unit, a memory, a detector, and a transmitting unit. The connection unit connects the terminal to a processing apparatus through a first communication channel for wireless communication using connection information. The acquisition unit acquires identification information of the processing apparatus. The memory stores the connection information for the first communication channel and the identification information such that the connection information is associated with the identification information. The detector detects that the connection to the processing apparatus through the first communication channel is cut off. The transmitting unit transmits, in a case where the detector detects that the connection to the processing apparatus is cut off, connection information used when the processing apparatus is connected to the terminal to the processing apparatus via a second communication channel using the connection information and the identification information stored in the memory.

16 Claims, 7 Drawing Sheets

(51) Int. Cl.
*H04L 29/14* (2006.01)
*H04N 1/00* (2006.01)
*H04W 84/12* (2009.01)

(52) U.S. Cl.
CPC ..... *H04N 1/00204* (2013.01); *H04N 1/00307* (2013.01); *H04N 2201/0094* (2013.01); *H04N 2201/326* (2013.01); *H04W 84/12* (2013.01)

(58) Field of Classification Search
USPC .................................. 709/206, 224; 370/328
See application file for complete search history.

(56) References Cited

U.S. PATENT DOCUMENTS

| | | | | |
|---|---|---|---|---|
| 2009/0307489 | A1* | 12/2009 | Endoh ..................... | G06F 21/10 713/168 |
| 2010/0246554 | A1* | 9/2010 | Alapuranen .......... | H04W 40/22 370/343 |
| 2011/0099264 | A1* | 4/2011 | Chapin ................... | H04L 41/12 709/224 |
| 2011/0237241 | A1 | 9/2011 | Nagasaki | |
| 2013/0103466 | A1* | 4/2013 | Fisher ...................... | H04W 4/21 705/14.4 |
| 2013/0265402 | A1* | 10/2013 | Tashiro .............. | A61B 1/00016 348/74 |
| 2014/0013100 | A1* | 1/2014 | Menzel ............ | H04N 21/43637 713/150 |
| 2014/0097937 | A1* | 4/2014 | Gercekci ................. | G08C 17/02 340/5.61 |
| 2014/0156375 | A1* | 6/2014 | Vaughan ............. | G06Q 30/0238 705/14.38 |
| 2014/0198727 | A1* | 7/2014 | Ogawara ............... | H04W 76/19 370/328 |
| 2014/0351880 | A1* | 11/2014 | Low ........................ | H04L 63/20 726/1 |
| 2014/0362726 | A1* | 12/2014 | Vandwalle ............ | H04W 84/18 370/254 |
| 2015/0163841 | A1* | 6/2015 | Zhao ........................ | H04W 4/08 455/41.2 |
| 2016/0212613 | A1* | 7/2016 | Huang .................... | H04W 8/20 |

FOREIGN PATENT DOCUMENTS

JP 2008-512891 A 4/2008
WO 2006/027725 A1 3/2006

OTHER PUBLICATIONS

Communication dated Dec. 13, 2018 from the State Intellectual Property Office of the P.R.C. in counterpart Application No. 201510648452.5.

* cited by examiner

TERMINAL, PROCESSING APPARATUS, PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-061407 filed Mar. 24, 2015.

BACKGROUND

Technical Field

The present invention relates to a terminal, a processing apparatus, a processing system, and a non-transitory computer readable medium.

SUMMARY

According to an aspect of the invention, there is provided a terminal including a connection unit, an acquisition unit, a memory, a detector, and a transmitting unit. The connection unit connects the terminal to a processing apparatus through a first communication channel for wireless communication using connection information. The acquisition unit acquires identification information of the processing apparatus, which is connected to the terminal through the first communication channel. The memory stores the connection information for the first communication channel and the identification information such that the connection information for the first communication channel is associated with the identification information. The detector detects that the connection to the processing apparatus through the first communication channel is cut off. The transmitting unit transmits, in a case where the detector detects that the connection to the processing apparatus is cut off, connection information used when the processing apparatus is connected to the terminal to the processing apparatus via a second communication channel different from the first communication channel using the connection information and the identification information stored in the memory.

BRIEF DESCRIPTION OF THE DRAWINGS

An exemplary embodiment of the present invention will be described in detail based on the following figures, wherein.

DETAILED DESCRIPTION

Figure 1:
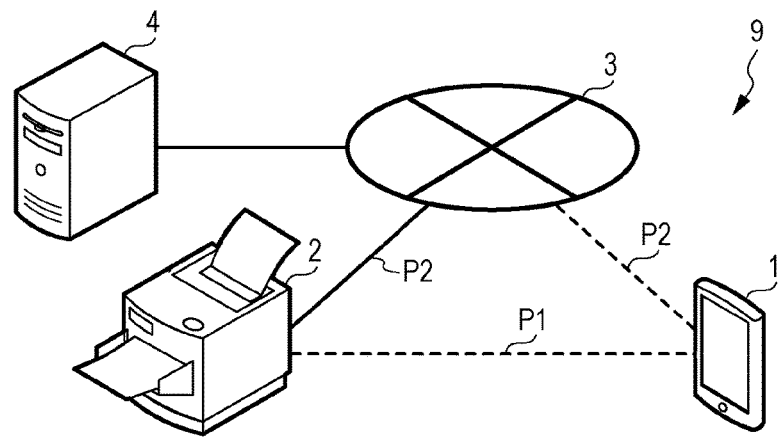
FIG. 1 is a diagram illustrating the configuration of the entirety of an image forming system according to a present exemplary embodiment.

1. Exemplary Embodiment 1-1. Configuration of Entirety of Image Forming System FIG. 1 is a diagram illustrating the configuration of the entirety of an image forming system 9 according to a present exemplary embodiment. As illustrated in FIG. 1, the image forming system 9 includes a terminal 1, an image forming apparatus 2, a mail server apparatus 4, and a communication line 3 that connects the terminal 1, the image forming apparatus 2, and the mail server apparatus 4 to one another.

The terminal 1 is wirelessly connected to the communication line 3. The image forming apparatus 2 and the mail server apparatus 4 are connected to the communication line 3 in a wired manner. The terminal 1, the image forming apparatus 2, and the mail server apparatus 4 communicate information with each other via the communication line 3.

In addition, the terminal 1 and the image forming apparatus 2 are configured such that the terminal 1 and the image forming apparatus 2 are capable of directly and wirelessly communicating information with each other without using the communication line 3. A communication channel through which the terminal 1 and the image forming apparatus 2 directly and wirelessly communicate with each other without using the communication line 3 is called a "first communication channel P1". That is, the first communication channel P1 is a communication channel for wireless communication through which the terminal 1 is connected to the image forming apparatus 2 without any other apparatuses interposed therebetween. As such a wireless communication technology, a communication method called Wi-Fi DIRECT® is known.

In contrast, a communication channel through which the terminal 1 communicates with the image forming apparatus 2 via the communication line 3 is called a "second communication channel P2". Note that, in general, a connection between the terminal 1 and the communication line 3 is relayed by an access point device (not illustrated), and a router device and the like (not illustrated) are disposed at a connection from the communication line 3 to the image forming apparatus 2. That is, the second communication channel P2 is a communication channel that passes through the communication line 3 and plural other devices.

The image forming apparatus 2 is an image output device that accepts a command issued by the terminal 1 and forms an image in accordance with the command. Note that the image forming system 9 may include plural terminals 1, plural image forming apparatuses 2, and plural mail server apparatuses 4.

1-2. Configuration of Terminal

Figure 2:
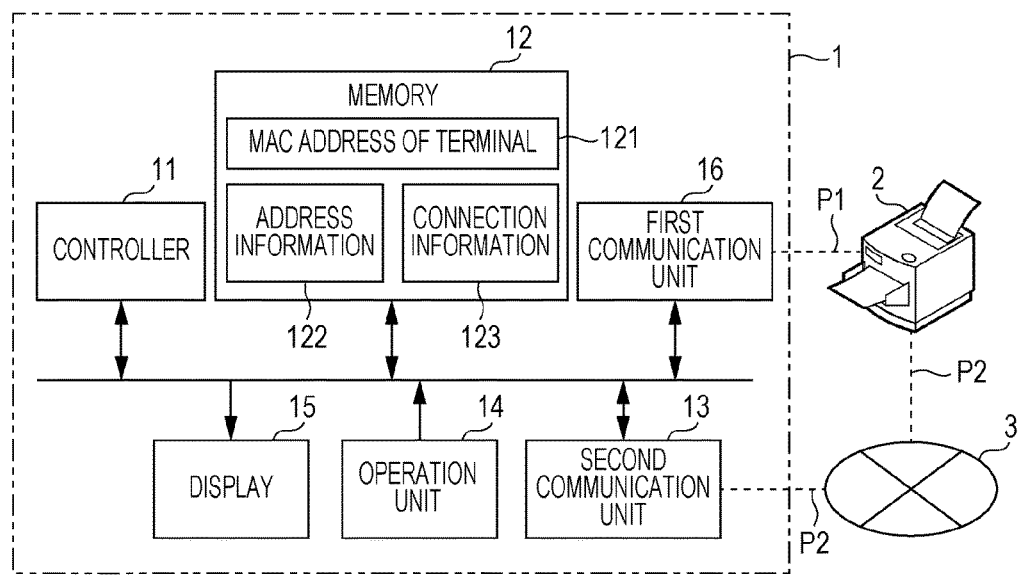
FIG. 2 is a diagram illustrating the configuration of a terminal according to the present exemplary embodiment.

FIG. 2 is a diagram illustrating the configuration of a certain terminal 1 according to the present exemplary embodiment. A controller 11 includes a central processing unit (CPU), a read-only memory (ROM), and a random-access memory (RAM), and controls various units of the terminal 1 by using the CPU reading out and executing a computer program (hereinafter simply referred to as a program) stored in the ROM or a memory 12.

A first communication unit 16 is a wireless-communication circuit based on, for example, the IEEE 802.11 standard, and forms the first communication channel P1 together with a third communication unit 26 of the image forming apparatus 2. In addition, the first communication unit 16 has a function for receiving an identification signal (beacon) transmitted from the image forming apparatus 2.

A second communication unit 13 is a wireless-communication circuit based on, for example, Long Term Evolution (LTE) or the like, and connects the terminal 1 to the communication line 3. The second communication unit 13 forms the second communication channel P2 together with a fourth communication unit 23 of the image forming apparatus 2.

An operation unit 14 includes an operator such as an operation button and the like for issuing various commands, accepts an operation performed by a user, and supplies a signal corresponding to the content of the operation to the controller 11. The operation unit 14 may also include a push button used to establish the first communication channel P1 together with the image forming apparatus 2.

A display 15 has a liquid crystal display, and displays information and the like stored in the memory 12 under control of the controller 11. In addition, the display 15 may form a touch panel together with the operation unit 14.

The memory 12 is a large-capacity memory such as a solid-state drive or the like, and stores programs that the CPU of the controller 11 reads. In addition, the memory 12 stores the MAC address 121 of the terminal 1, and includes an area where address information 122 and connection information 123 are stored.

Figure 3:
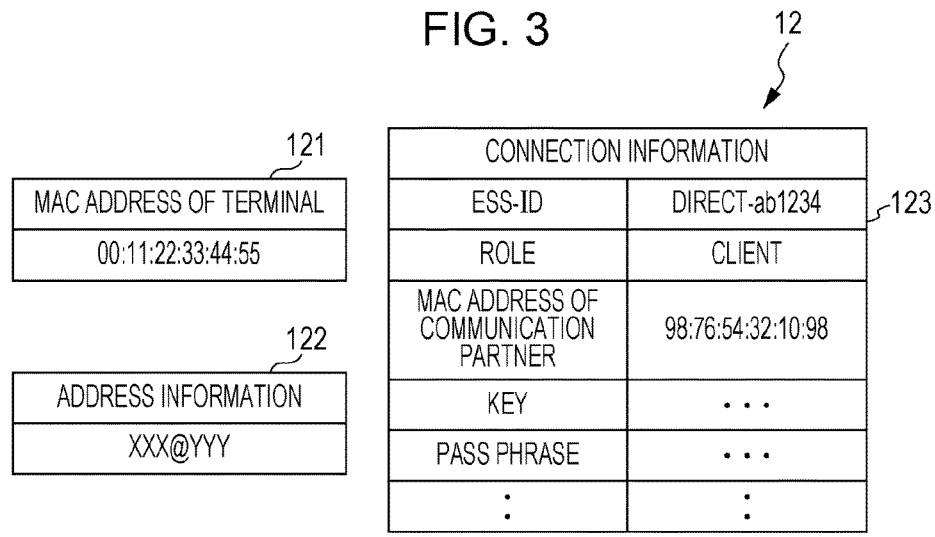
FIG. 3 is a diagram for describing the content stored in a memory.

FIG. 3 is a diagram for describing the content stored in the memory 12. The MAC address 121 is identification information indicating the physical address of the terminal 1 itself, and is a Media Access Control (MAC) address here.

The address information 122 is an e-mail address transmitted from the image forming apparatus 2, to which the terminal 1 is connected using the first communication channel P1, and is an e-mail address representing the image forming apparatus 2. The connection information 123 is various types of information needed when the terminal 1 is connected to the image forming apparatus 2 using the first communication channel P1. The connection information 123 includes, for example, an extended service set identifier (ESS-ID) used to identify the first communication channel P1, a role in the first communication channel P1 (either an owner or a client of a certain connection), the MAC address (physical address) of a communication partner, a master key or a temporary key necessary to transmit and receive encrypted information via the first communication channel P1, a pass phrase used to generate a key, and the like.

1-3. Configuration of Image Forming Apparatus

Figure 4:
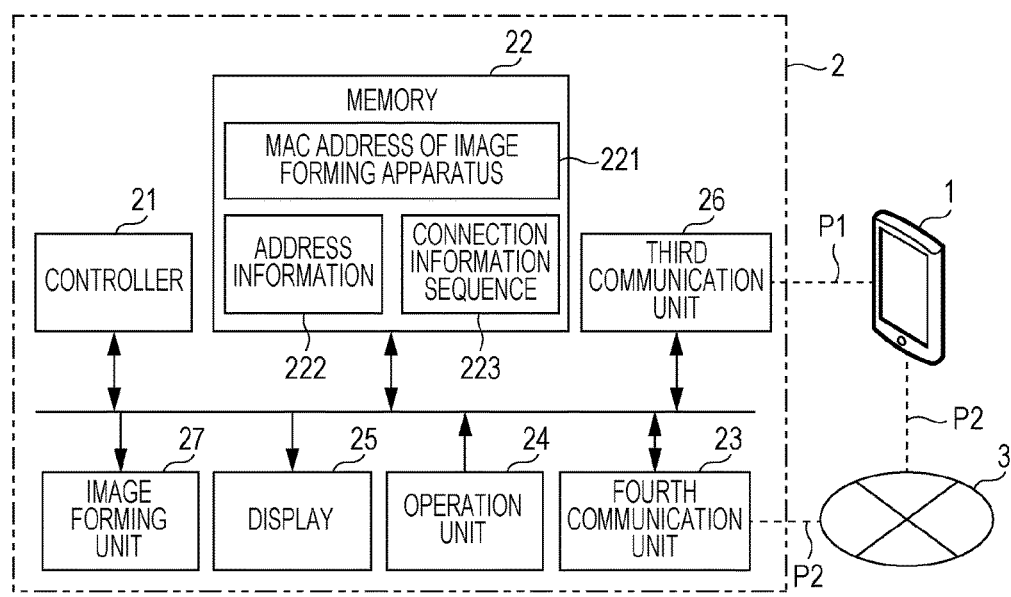
FIG. 4 is a diagram illustrating the configuration of an image forming apparatus according to the present exemplary embodiment.

FIG. 4 is a diagram illustrating the configuration of the image forming apparatus 2 according to the present exemplary embodiment. A controller 21 includes a CPU, a ROM, and a RAM, and controls various units of the image forming apparatus 2 by using the CPU reading out and executing a program stored in the ROM or a memory 22.

The third communication unit 26 is a wireless-communication circuit based on, for example, the IEEE 802.11 standard, and forms the first communication channel P1 together with the first communication unit 16 of the terminal 1. In addition, the third communication unit 26 has a function for transmitting an identification signal to others around the third communication unit 26.

The fourth communication unit 23 is a wired-communication circuit that connects the image forming apparatus 2 to the communication line 3. The fourth communication unit 23 forms the second communication channel P2 together with the second communication unit 13 of the terminal 1. Note that the fourth communication unit 23 may also be a wireless-communication circuit that connects the image forming apparatus 2 to the communication line 3.

An operation unit 24 includes an operator such as an operation button and the like for issuing various commands, accepts an operation performed by a user, and supplies a signal corresponding to the content of the operation to the controller 21. The operation unit 24 may also include a push button used to establish the first communication channel P1 together with the terminal 1.

A display 25 has a liquid crystal display, and displays information and the like stored in the memory 22 under control of the controller 21. In addition, the display 25 may form a touch panel together with the operation unit 24.

An image forming unit 27 forms an image by fixing toner on a medium such as a sheet using an electrophotographic system under control of the controller 21.

The memory 22 includes a ROM, which is read only, and a RAM, which is rewritable. The ROM of the memory 22 stores programs that the CPU of the controller 21 reads, the MAC address 221 of the image forming apparatus 2, and address information 222. The RAM of the memory 22 is a memory area, where stored information is lost when power is shut off, and includes an area for storing a connection information sequence 223. Note that the ROM of the memory 22 may also include a memory that is rewritable and retains its stored information even after power is shut off such as an electrically erasable programmable read-only memory (EEPROM), a flash memory, a solid state drive, or the like.

Figure 5:
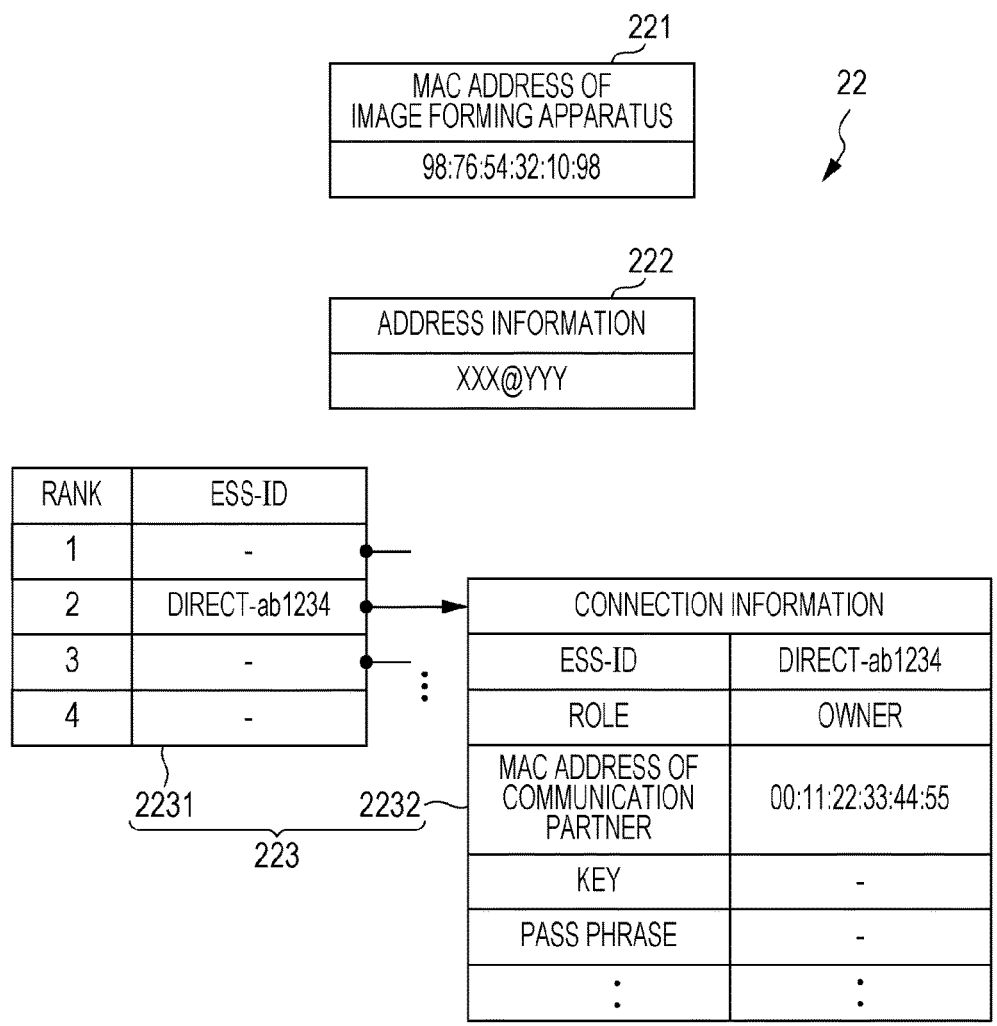
FIG. 5 is a diagram for describing the content stored in a memory.

FIG. 5 is a diagram for describing the content stored in the memory 22. The MAC address 221 is identification information indicating the physical address of the image forming apparatus 2 itself, and is a MAC address here.

The address information 222 is identification information used to make it possible for the image forming apparatus 2 to receive information through the second communication channel P2, and specifically is an e-mail address of the image forming apparatus 2 itself. When an e-mail having the e-mail address described in the address information 222 as a destination is transmitted, the e-mail is stored in a mail spool of the mail server apparatus 4 located on the second communication channel P2. The image forming apparatus 2, for example, periodically retrieves such an e-mail stored in the mail server apparatus 4 as an e-mail addressed to the image forming apparatus 2. The address information 222 is transmitted to the terminal 1 through the first communication channel P1 when the image forming apparatus 2 is connected to the terminal 1 via the first communication channel P1. The terminal 1 that has received the address information 222 stores the content of the address information 222 in the address information 122. The terminal 1 transmits an e-mail to the image forming apparatus 2 via the second communication channel P2 using the stored address information 122.

The connection information sequence 223 is a queue in which connection information is arranged on a per-terminal-1 basis, the connection information becoming necessary when the image forming apparatus 2 is connected to plural terminals 1, communication partners, using the first communication channel P1. The connection information sequence 223 illustrated in FIG. 5 includes a priority table 2231 and connection information 2232. The priority table 2231 includes ESS-IDs for identifying connections from the image forming apparatus 2 to plural terminals 1. A priority rank and certain connection information 2232 are assigned to each of the ESS-IDs. Connection information described in the connection information 2232 is information that the image forming apparatus 2 needs to establish a connection identified by a corresponding ESS-ID, and is the same as the connection information of the terminal 1, a communication partner, except for a role in the first communication channel P1 and the MAC address of a communication partner.

For example, when the size of a recordable area in the RAM of the memory 22 becomes smaller than a predetermined threshold, connection information corresponding to the item having the lowest priority described in the priority table 2231 is removed, and this removal is performed in ascending order of priority. In addition, when power to the image forming apparatus 2 is shut off, the connection information sequence 223 stored in the RAM of the memory 22 is deleted.

1-4. Functional Configuration of Image Forming System

Figure 6:
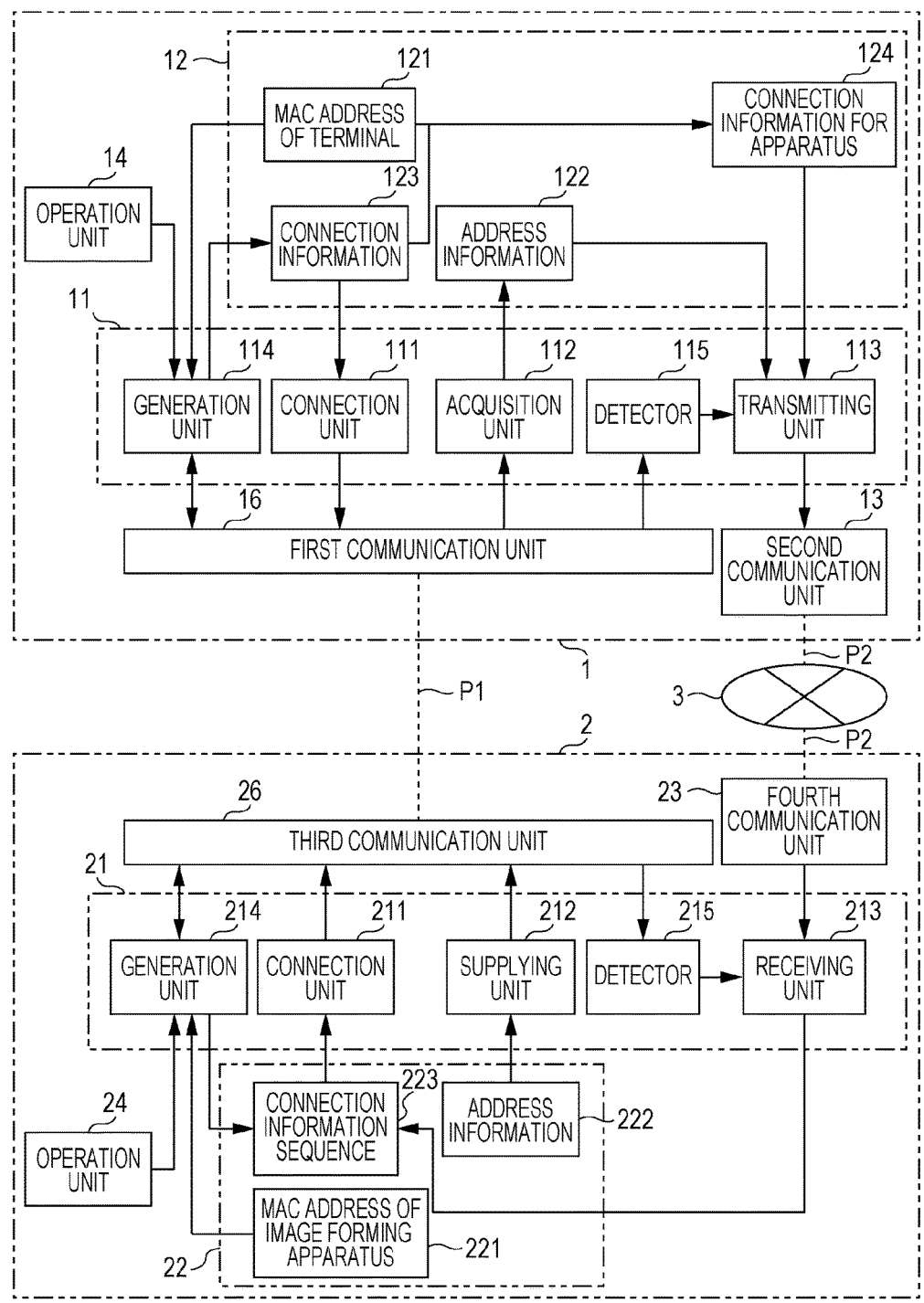
FIG. 6 is a diagram illustrating a functional configuration of the image forming system.

FIG. 6 is a diagram illustrating a functional configuration of the image forming system 9. The controller 11 of the terminal 1 serves as a connection unit 111, an acquisition unit 112, a transmitting unit 113, a generation unit 114, and a detector 115 by executing a program stored in the memory 12. The controller 21 of the image forming apparatus 2 serves as a connection unit 211, a supplying unit 212, a receiving unit 213, a generation unit 214, and a detector 215 by executing a program stored in the memory 22.

The generation unit 114 starts communicating information with the image forming apparatus 2 through the first communication channel P1 in accordance with an operation performed using the operation unit 14, and generates connection information 123 necessary for establishing a connection to the image forming apparatus 2 through the first communication channel P1. The generated connection information 123 is stored in the memory 12.

The connection unit 111 causes the terminal 1 to be connected to the image forming apparatus 2 using the connection information 123 through the first communication channel P1 for wireless communication.

The acquisition unit 112 acquires the address information 222, which is identification information of the image forming apparatus 2, such that the address information 222 is associated with the connection information used by the image forming apparatus 2 when the terminal 1 is connected to the image forming apparatus 2 using the first communication channel P1. The acquisition unit 112 stores the acquired address information 222 as the address information 122 in the memory 12.

The detector 115 detects that a connection to the image forming apparatus 2 through the first communication channel P1 is cut off. The detector 115 detects that a connection to the image forming apparatus 2 is cut off, for example, by monitoring the first communication unit 16.

The detector 115 may also detect that a connection to the image forming apparatus 2 is cut off in the case where there is no response for the connection through the first communication channel P1 from the image forming apparatus 2 for a predetermined period of time. Specifically, for example, when there is no connection to the image forming apparatus 2 for a certain period of time as a result of monitoring of the first communication unit 16, the detector 115 detects that a connection to the image forming apparatus 2 is at least temporarily cut off. Here, the detector 115 send a command to the connection unit 111 and causes the connection unit 111 to request a connection from the image forming apparatus 2. After waiting for a response to this request over a predetermined period of time, the detector 115 detects that a connection to the image forming apparatus 2 is cut off when there is no response.

When the detector 115 detects that a connection to the image forming apparatus 2 through the first communication channel P1 is cut off, the transmitting unit 113 transmits connection information corresponding to the address information 122 acquired by the acquisition unit 112 to the image forming apparatus 2 via the second communication channel P2 using the address information 122. Here, the connection information transmitted by the transmitting unit 113 may be, as indicated by a broken line in FIG. 6, the connection information 123 corresponding to the address information 122 and connection information 124 for the apparatus and generated from the MAC address 121 of the terminal 1.

The connection information 124 for the apparatus is the same, in terms of content, as the connection information 2232 used by the image forming apparatus 2 when a connection is established to the terminal 1 through the first communication channel P1. Specifically, the connection information 124 for the apparatus is information obtained by rewriting "the MAC address of a communication partner" of the connection information 123 into the content stored in the MAC address 121 of the terminal 1 and rewriting the "role" into information on the communication partner. The information on the communication partner is, for example, not a "client" but an "owner" when the "role" of the connection information 123 is a "client".

In addition, the transmitting unit 113 may also associate the connection information 123 with the MAC address 121 of the terminal 1 and transmit the connection information 123 and the MAC address 121 to the image forming apparatus 2. In this case, the image forming apparatus 2 may generate the connection information 2232, which is to be added to the connection information sequence 223, from the received connection information 123 and the received MAC address 121 of the terminal 1.

The generation unit 214 starts communicating information with the terminal 1 through the first communication channel P1 in accordance with an operation performed using the operation unit 24, and generates connection information 2232 necessary for establishing a connection to the terminal 1 through the first communication channel P1. The generated connection information 2232 is associated with either of the ESS-IDs included in the priority table 2231, is caused to be included in the connection information sequence 223, and is stored in the memory 22.

The connection unit 211 is connected to the terminal 1 using the connection information sequence 223 through the first communication channel P1 for wireless communication.

The supplying unit 212 associates the address information 222 (identification information) of the image forming apparatus 2 with the connection information 2232 used by the image forming apparatus 2 when the image forming apparatus 2 is connected to the terminal 1 using the first communication channel P1, and supplies the address information 222 of the image forming apparatus 2 to the terminal 1.

The detector 215 detects that a connection to the terminal 1 through the first communication channel P1 is cut off. The detector 215 detects that a connection to the terminal 1 is cut off, for example, by monitoring the third communication unit 26.

In addition, in the case where the detector 215 monitors the memory 22 and the connection information sequence 223 has been lost from the image forming apparatus 2, the detector 215 may detect that a connection to the terminal 1 is cut off.

In the case where a connection to the terminal 1 through the first communication channel P1 is cut off, the receiving unit 213 uses the address information 222 supplied by the supplying unit 212 and receives connection information corresponding to the address information 222 from the terminal 1 via the second communication channel P2. Then, when the detector 215 detects that the connection to the terminal 1 is cut off, the receiving unit 213 stores the received connection information in the connection information sequence 223 of the memory 22.

1-5. Operation of Image Forming System (1) Operation for Initial Connection

Figure 7:
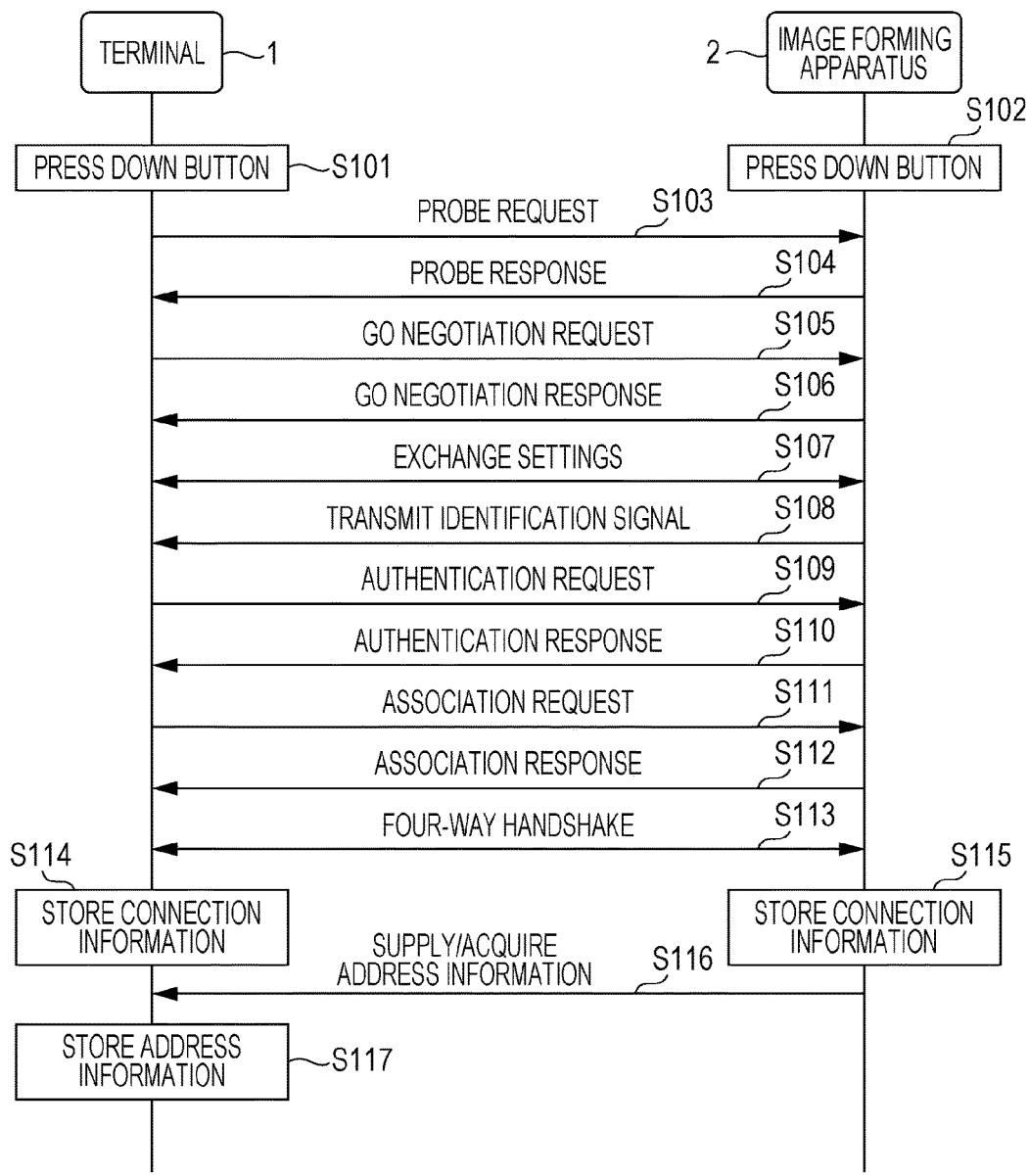
FIG. 7 is a sequence diagram for describing an operation for an initial connection in the image forming system.

FIG. 7 is a sequence diagram for describing an operation for an initial connection in the image forming system 9. When the terminal 1 is connected to the image forming apparatus 2 for the first time, the image forming system 9 uses the operation units 14 and 24 of the terminal 1 and the image forming apparatus 2. A user presses down a push button provided at the operation unit 14 of the terminal 1 (step S101), and then presses down a push button provided at the image forming apparatus 2 within a predetermined period of time (for example, a few tens of seconds) (step S102).

Note that step S101 may be performed after step S102. This initial connection established using push buttons is considered to have a high level of security since the user performs an operation within a predetermined period of time and establishes a one-to-one connection between two devices (the terminal 1 and the image forming apparatus 2) existing with a certain distance therebetween such that a wireless signal of one of the two devices reaches the other and vice versa.

For an initial connection, a method in which a so-called personal identification number (PIN) code is input may be used. This method is a method in which a user inputs a PIN code into one of two devices to be connected to each other within a predetermined period of time and a connection is established, the PIN code being generated by the other one of the two devices using a random number or the like.

The terminal 1 whose push button has been pressed down transmits a probe request toward others around the terminal 1 (step S103). A probe request is a request for identification information used to identify a connection, and specifically is used to request an ESS-ID. The image forming apparatus 2 that exists near the terminal 1 and has received the above-described probe request transmits a probe response including an ESS-ID toward the terminal 1 (step S104).

The terminal 1 that has received the probe response identifies the ESS-ID of the connection in accordance with this probe response, and transmits a request for group owner (GO) negotiation (a GO negotiation request) to the image forming apparatus 2 (step S105). Here, since the image forming apparatus 2 is set to be the owner of the connection, the image forming apparatus 2 that has received this GO negotiation request transmits a response indicating that the image forming apparatus 2 becomes an owner (a GO negotiation response) to the terminal 1 (step S106).

The terminal 1 that has received the GO negotiation response sets the connection information 123 such that the terminal 1 becomes a client, and the terminal 1 and the image forming apparatus 2 exchange settings regarding an encryption scheme with each other (step S107).

Next, the image forming apparatus 2 transmits an identification signal from the third communication unit 26 (step S108), and the terminal 1 that has received this identification signal using the first communication unit 16 transmits an authentication request by which the image forming apparatus 2 is caused to perform authentication on itself (step S109). The image forming apparatus 2 that has received the authentication request performs authentication for the connection to the terminal 1 using the settings obtained by exchange in step S107, and transmits an authentication response indicating the authentication result to the terminal 1 (step S110).

The terminal 1 that has received the authentication response transmits an association request toward the image forming apparatus 2 in the case where the authentication result is positive (step S111). An association request is a request for establishment of an encrypted connection through the first communication channel P1. The image forming apparatus 2 that has received the association request transmits an association response the content of which is a response to the association request toward the terminal 1 (step S112).

Then, after a procedure called a four-way handshake (4-way handshake) is performed (step S113), the terminal 1 and the image forming apparatus 2 are connected to each other. Here, for the connection, connection information that the terminal 1 needs and connection information that the image forming apparatus 2 needs are generated. The terminal 1 stores the generated connection information as the connection information 123 in the memory 12 (step S114). The image forming apparatus 2 stores the generated connection information in the memory 22 by adding the generated connection information as the connection information 2232 to the connection information sequence 223 (step S115). Step S114 may be performed after step S115.

The image forming apparatus 2 associates the address information 222 of the image forming apparatus 2 with the generated connection information, and supplies the address information 222 to the terminal 1 (step S116). The terminal 1 that has received the address information 222 stores the address information 222 as the address information 122 in the memory 12 (step S117).

(2) Connection Operation for Second and Subsequent Times

Figure 8:
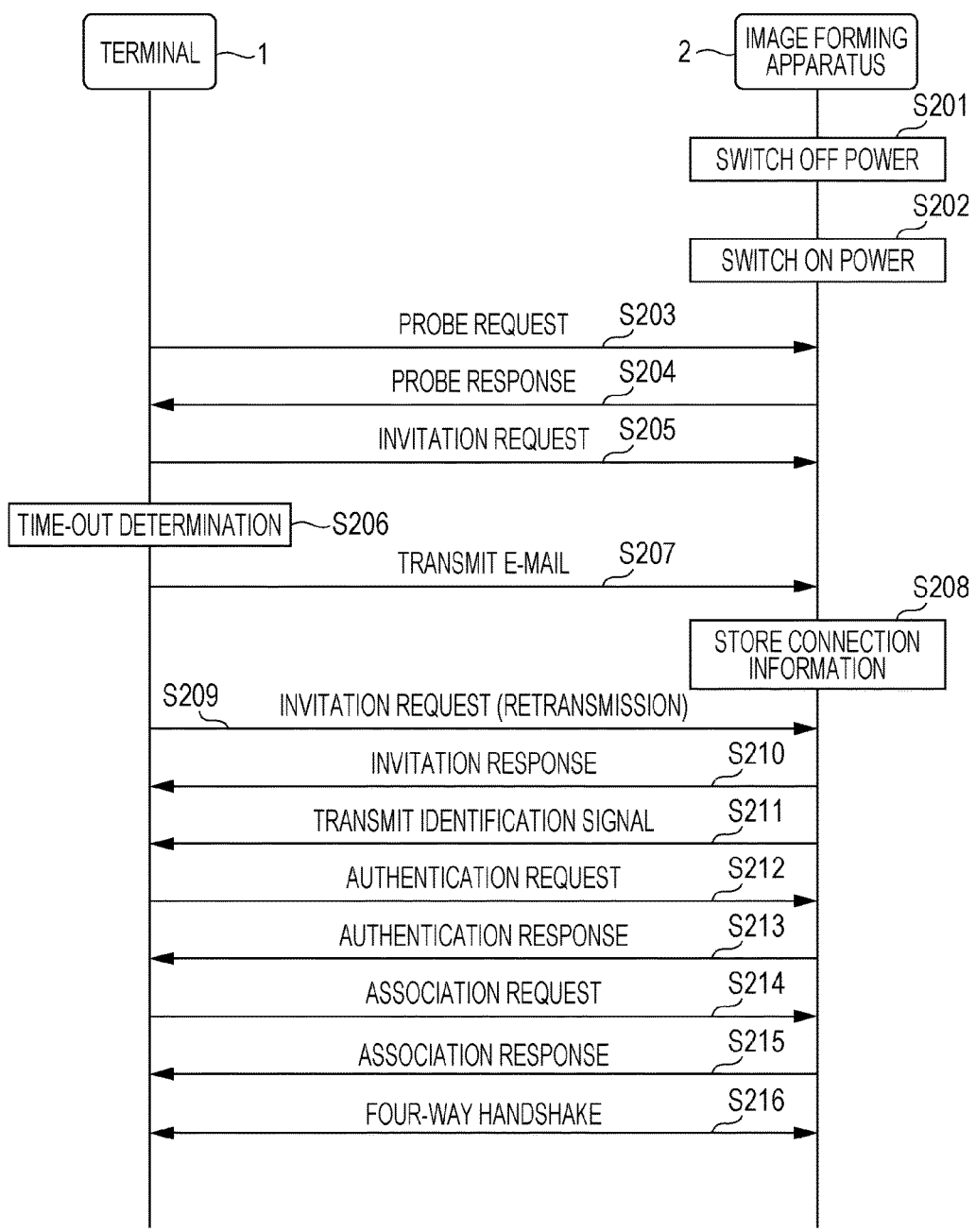
FIG. 8 is a sequence diagram for describing a connection operation for the second and subsequent times in the image forming system.

FIG. 8 is a sequence diagram for describing a connection operation for the second and subsequent times in the image forming system 9. When the user operates the operation unit 24 and switches off the power of the image forming apparatus 2 (a power-down state) (step S201), the connection information sequence 223 is deleted from the memory 22 of the image forming apparatus 2. Even when the user operates the operation unit 24 of the image forming apparatus 2 and switches on the power (a power supply state) after the power has been switched off (step S202), the content of the connection information sequence 223 stored before the power has been switched off is not recovered.

The terminal 1 detects that the connection to the image forming apparatus 2 through the first communication channel P1 is at least temporarily cut off due to power off of the image forming apparatus 2. Here, the terminal 1 transmits a probe request toward others around the terminal 1 (step S203). The image forming apparatus 2 that exists near the terminal 1 and has received the above-described probe request transmits a probe response including an ESS-ID toward the terminal 1 (step S204).

The terminal 1 that has received the probe response identifies the ESS-ID of the connection in accordance with this probe response. In the case where it is determined that the identified ESS-ID is an ESS-ID used for a previous connection, the terminal 1 transmits an invitation request toward the image forming apparatus 2 that has transmitted the probe response (step S205). An invitation request is an invitation to a connection that has already been established, which is called a connection group, and is a request to a target device for participation in the connection group.

The image forming apparatus 2 that has received the invitation request searches the connection information sequence 223 of the memory 22 for the connection group to which the image forming apparatus 2 is invited. However, since the content of the connection information sequence 223 stored before the power off is lost due to the power off, the image forming apparatus 2 does not respond to the invitation request. The terminal 1 performs a time-out determination as to whether or not a predetermined period of time has passed after transmission of the invitation request (step S206).

In the case where it is determined that the predetermined period of time has passed after the transmission of the invitation request, the terminal 1 determines that the connection to the image forming apparatus 2 through the first communication channel P1 is cut off. The terminal 1 uses the address information 122 stored in step S117 and transmits connection information corresponding to the address information 122 to the image forming apparatus 2 through the second communication channel P2 (step S207). Specifically, the address information 122 is an e-mail address of the image forming apparatus 2, and this transmission is transmission of an e-mail including the connection information.

The e-mail transmitted from the terminal 1 via the second communication channel P2 is saved in a mail spool of the mail server apparatus 4 (see FIG. 1). The image forming apparatus 2, for example, periodically extracts e-mails addressed to the image forming apparatus 2 from the mail spool, and thus the e-mail arrives at the image forming apparatus 2.

The image forming apparatus 2 that has received the e-mail adds the connection information included in the e-mail to the connection information sequence 223 and stores the connection information (step S208).

The terminal 1 retransmits the invitation request toward the image forming apparatus 2 after transmission of the e-mail (step S209). Since the image forming apparatus 2 that has received the invitation request again stores connection information, the image forming apparatus 2 transmits an invitation response the content of which is a response to the invitation request (step S210). As a result, the terminal 1 and the image forming apparatus 2 share settings regarding roles of the terminal 1 and the image forming apparatus 2, the encryption scheme, and the like set in the initial connection.

Next, the image forming apparatus 2 transmits an identification signal from the third communication unit 26 (step S211), and the terminal 1 that has received this identification signal using the first communication unit 16 transmits an authentication request by which the image forming apparatus 2 is caused to perform authentication on itself (step S212). The image forming apparatus 2 that has received the authentication request performs authentication for the connection to the terminal 1 using the settings and the like shared by the end of transmission of the invitation response in step S210, and transmits an authentication response indicating the authentication result to the terminal 1 (step S213).

The terminal 1 that has received the authentication response transmits an association request toward the image forming apparatus 2 in the case where the authentication result is positive (step S214). The image forming apparatus 2 that has received the association request responds to the association request (step S215). Then, after a four-way handshake is performed (step S216), the terminal 1 and the image forming apparatus 2 are connected to each other.

2. Modification

The exemplary embodiment has been described above, and the content of the exemplary embodiment may be modified as in the following. In addition, some or all of the following modifications may also be combined.

2-1. Modification 1

In the above-described exemplary embodiment, in the case where it is determined that the predetermined period of time has passed after transmission of the invitation request, the terminal 1 determines that the connection to the image forming apparatus 2 through the first communication channel P1 is cut off, and the terminal 1 transmits connection information to the image forming apparatus 2 through the second communication channel P2 using the address information 122. However, the terminal 1 may transmit the above-described connection information without determining whether or not the predetermined period of time has passed.

Figure 9:
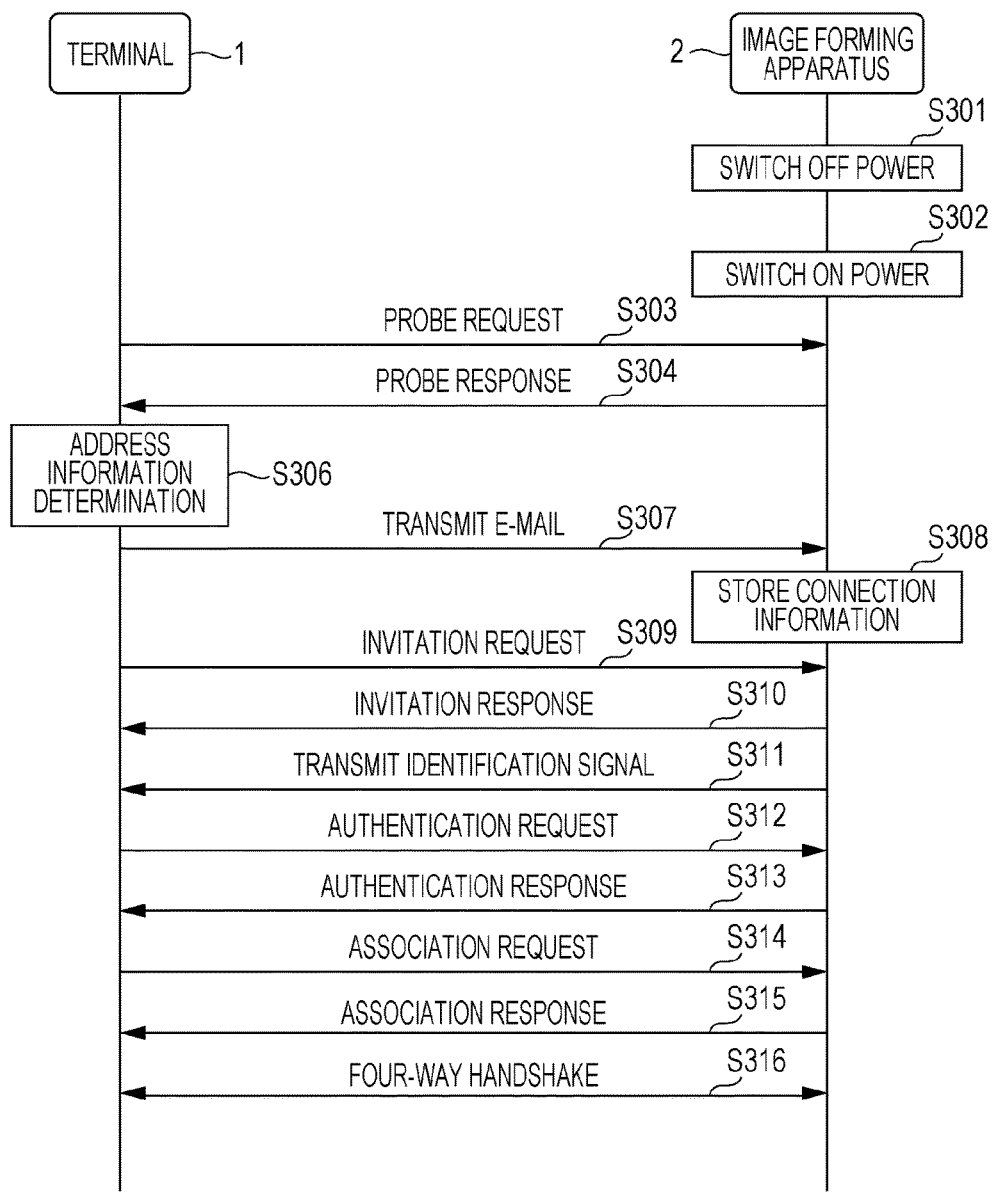
FIG. 9 is a sequence diagram for describing a connection operation for the second and subsequent times in an image forming system in a modification.

FIG. 9 is a sequence diagram for describing a connection operation for the second and subsequent times in the image forming system 9 in this modification. The operation from step S301 to step S304 in FIG. 9 is the same as the operation from step S201 to step S204 in FIG. 8.

Here, instead of transmission of an invitation request of step S205, the terminal 1 determines whether or not address information of the image forming apparatus 2 is described with reference to the address information 122 of the memory 12 (step S306). Then, in the case where it is determined that the address information of the image forming apparatus 2 is described in the address information 122, the terminal 1 uses the address information 122 and transmits connection information corresponding to the address information 122 to the image forming apparatus 2 through the second communication channel P2 (step S307).

The operation from step S308 to step S316 subsequent to step S307 is the same as the operation from step S208 to step S216 in FIG. 8.

2-2. Modification 2

The image forming apparatus 2 illustrated in FIG. 1 includes the image forming unit 27; however, the image forming apparatus 2 may include an interface for sending a command to cause another image forming apparatus to form an image. In this case, the image forming apparatus 2 may be a processing apparatus that does not include the image forming unit 27. Furthermore, the process performed by this processing apparatus is not limited to forming of images. For example, the processing apparatus may perform a process for reading an image formed on a medium or the like in accordance with a command issued by the terminal 1.

Note that the portion obtained by excluding the above-described "another image forming apparatus" from the image forming system 9 is interpreted as a processing system including the terminal 1, and a processing apparatus that accepts a command to perform a certain process from the terminal 1 and performs the certain process in accordance with the command.

2-3. Modification 3

In the above-described exemplary embodiment, an e-mail address is used an example of the address information 222 (identification information) of the image forming apparatus 2 (processing apparatus); however, the identification information of the processing apparatus is not limited to an e-mail address and may also be address information of the processing apparatus for a second communication channel. The identification information of the processing apparatus may be, for example, an IP address used for the Transmission Control Protocol (TCP)/the Internet Protocol (IP), or a uniform resource locator (URL) used for the Hyper Text Transfer Protocol (HTTP). A terminal may transfer connection information via the second communication channel to the processing apparatus identified by the above-described address information using these communication protocols.

2-4. Modification 4

Programs executed by the controller 11 of the terminal 1 and the controller 21 of the image forming apparatus 2 may be provided in a state in which the programs are stored in a computer readable recording medium. Examples of the computer readable recording medium include a magnetic recording medium such as a magnetic tape or a magnetic disk, an optical recording medium such as an optical disc, a magneto-optical recording medium, a semiconductor memory, and the like. In addition, these programs may also be downloaded via the Internet or the like. Note that various devices other than a CPU may be applied as a controller examples of which are illustrated as the controller 11 and the controller 21 described above. For example, a dedicated processor or the like is used.

The foregoing description of the exemplary embodiment) of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal comprising:
    a memory, and
    a processor configured to execute:
        a connection unit configured to connect the terminal to a processing apparatus via a first the for wireless communication, using connection information;
        an acquisition unit configured:
            to acquire identification information of the processing apparatus, and
            to store the connection information for the first communication channel and the identification information in the memory, such that the connection information for the first communication channel is associated with the identification information;
        a detector configured to detect, in response to there being no connection via the first communication channel from the processing apparatus for more than a predetermined period of time, that the connection between the terminal and the processing apparatus, via the first communication channel, is cut off; and
        a transmitting unit configured to transmit, in response to the detector detecting that the connection via the first communication channel to the processing apparatus is cut off, the connection information from the terminal to the processing apparatus via a second communication channel,
    wherein the connection information is associated with the identification information stored in the memory,
    wherein the connection unit includes key information indicating a key used to communicate encrypted information via the first communication channel, and a pass phrase used to generate the key,
    wherein the detector is further configured to determine whether there is no connection via the first communication channel from the processing apparatus for more than the predetermined period of time by monitoring a request to the processing apparatus for a time-out, and
    wherein the processor is further configured to delete the connection information from the memory during a power-down of the processing apparatus.

2. The terminal according to claim 1, wherein
    the identification information is an e-mail address, and
    the transmitting unit is further configured to transmit an e-mail including the connection information to the processing apparatus.

3. The terminal according to claim 1, wherein
    the identification information is an Internet Protocol address, and
    the transmitting unit is further configured to transmit the connection information to the processing apparatus using the Transmission Control Protocol/the Internet Protocol.

4. The terminal according to claim 1, wherein
    the identification information is a uniform resource locator, and
    the transmitting unit is further configured to transmit the connection information to the processing apparatus using the Hyper Text Transfer Protocol.

5. The terminal according to claim 2, wherein the connection unit includes key information indicating a key used to communicate encrypted information via the first communication channel, and a pass phrase used to generate the key.

6. The terminal according to claim 3, wherein the connection unit includes key information indicating a key used to communicate encrypted information via the first communication channel, and a pass phrase used to generate the key.

7. A processing apparatus comprising:
    a memory, and
    a processor configured to execute:
        a connection unit configured to connect the processing apparatus to a terminal via a first communication channel for wireless communication, using connection information;
        a supplying unit configured to supply identification information of the processing apparatus to the terminal;
        a detector configured to detect, in response to the connection information stored in the memory of the processing apparatus being lost by being deleted from the processing apparatus, that the connection to the terminal is cut off; and
        a receiving unit configured to receive, in response to the connection from the processing apparatus to the terminal, via the first communication channel, being cut off, the connection information from the terminal via a second communication channel,
    wherein the connection unit is further configured to connect the processing apparatus to the terminal using the received connection information,
    wherein the connection unit includes key information indicating a key used to communicate encrypted information via the first communication channel, and a pass phrase used to generate the key, wherein the detector is further configured to determine whether there is no connection via the first communication channel from the processing apparatus for more than the predetermined period of time by monitoring a request to the processing apparatus for a time-out, and wherein the processor is further configured to delete the connection information from the memory during a power-down of the processing apparatus.

8. The processing apparatus according to claim 7, wherein the identification information is an e-mail address, and
the receiving unit is further configured to receive an e-mail including the connection information from the terminal.

9. The processing apparatus according to claim 7, wherein the identification information is an Internet Protocol address, and
the receiving unit is further configured to receive the connection information from the terminal using the Transmission Control Protocol/the Internet Protocol.

10. The processing apparatus according to claim 7, wherein
the identification information is a uniform resource locator, and
the receiving unit is further configured to receive the connection information from the terminal using the Hyper Text Transfer Protocol.

11. The processing apparatus according to claim 7, wherein
in a case where the detector detects that the connection is cut off, the receiving unit is further configured to cause the memory to store received connection information, and
the connection unit is further configured to connect the processing apparatus to the terminal via the first communication channel using the connection information stored in the memory.

12. The processing apparatus according to claim 8, wherein
in a case where the detector detects that the connection is cut off, the receiving unit is further configured to cause the memory to store received connection information, and
the connection unit is further configured to connect the processing apparatus to the terminal via the first communication channel using the connection information stored in the memory.

13. The processing apparatus according to claim 7, further comprising:
an accepting unit configured to accept a command to perform a process from the terminal when the processing apparatus is connected to the terminal by the connection unit; and
a performing unit configured to perform the process in accordance with the command accepted by the accepting unit.

14. The processing apparatus according to claim 8, further comprising:
an accepting unit configured to accept a command to perform a process from the terminal when the processing apparatus is connected to the terminal by the connection unit; and
a performing unit configured to perform the process in accordance with the command accepted by the accepting unit.

15. A processing system comprising:
a terminal; and
a processing apparatus, wherein
the terminal includes:
a memory, and
a processor configured to execute:
a first connection unit configured to connect the terminal to the processing apparatus via a first communication channel for wireless communication using first connection information,
an acquisition unit configured
to acquire identification information of the processing apparatus,
to store the first connection information for the first communication channel and the identification information in the memory, such that the first connection information for the first communication channel is associated with the identification information,
a detector configured to detect, in response to a connection via the first communication channel from the processing apparatus for more than a predetermined period of time, that the connection between the terminal and the processing apparatus, via the first communication channel is cut off, and
a transmitting unit configured to transmit, in response to the detector detecting that the connection via the first communication channel to the processing apparatus is cut off, second connection information from the terminal to the processing apparatus via a second communication channel, the second connection information using the first connection information and the identification information stored in the memory, and
the processing apparatus includes a memory and a processor, the processor configured to execute:
a second connection unit configured to connect the processing apparatus to the terminal via the first communication channel for wireless communication, using the second connection information,
a supplying unit configured to supply identification information of the processing apparatus to the terminal,
a second detector configured to detect, in response to the connection information stored in the memory of the processing apparatus being lost by being deleted from the processing apparatus, that the connection to the terminal is cut off,
a receiving unit configured to receive, in response to the connection from the processing apparatus to the terminal, via the first communication channel, being cut off, the second connection information from the terminal via the second communication channel,
an accepting unit configured to accept a command to perform a process from the terminal when the processing apparatus is connected to the terminal by the second connection unit, and
a performing unit configured to perform the process in accordance with the command accepted by the accepting unit, wherein
the second connection unit is further configured to connect the processing apparatus to the terminal using the second connection information received by the receiving unit,
wherein at least one of the first connection unit and the second connection unit includes key information indicating a key used to communicate encrypted information via the first communication channel, and a pass phrase used to generate the key, wherein at least one of the first detector and the second detector is further configured to determine whether there is no connection via the first communication channel from the processing apparatus for more than the predetermined period of time by monitoring a request to the processing apparatus for a time-out, and wherein the processor is further configured to delete the connection information from the memory during a power-down of the processing apparatus.

16. A non-transitory computer readable medium storing a program causing a computer to execute a process, the process comprising:

connecting the computer to a processing apparatus via a first communication channel for wireless communication using connection information;

acquiring identification information of the processing apparatus;

storing the connection information for the first communication channel and the identification information, such that the connection information for the first communication channel is associated with the identification information;

detecting, in response to there being no connection via the first communication channel from the processing apparatus for more than a predetermined period of time, that the connection between the computer and the processing apparatus, via the first communication channel is cut off; and transmitting, in response to detecting that the connection via the first communication channel to the processing apparatus is cut off, the connection information from the computer to the processing apparatus via a second communication channel, wherein the connection information is associated with the stored identification information, wherein the processing apparatus includes key information indicating a key used to communicate encrypted information via the first communication channel, and a pass phrase used to generate the key, wherein the processing apparatus is further configured to determine whether there is no connection via the first communication channel from the processing apparatus for more than the predetermined period of time by monitoring a request to the processing apparatus for a time-out, and wherein the processing apparatus is further configured to delete the connection information from a memory during a power-down of the processing apparatus.

* * * * *